(12) United States Patent
Kismarton et al.

(10) Patent No.: US 7,837,148 B2
(45) Date of Patent: Nov. 23, 2010

(54) COMPOSITE WING-BODY JOINT

(75) Inventors: Max U. Kismarton, Renton, WA (US); Willard N. Westre, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 196 days.

(21) Appl. No.: 11/423,885

(22) Filed: Jun. 13, 2006

(65) Prior Publication Data
US 2009/0084899 A1   Apr. 2, 2009

(51) Int. Cl.
B64C 1/26 (2006.01)
(52) U.S. Cl. .................. 244/123.1; 244/133; 428/57
(58) Field of Classification Search ............. 244/117 R, 244/119, 120, 123.1, 123.2, 132, 133, 123.5; 428/57, 58, 59, 60, 61
See application file for complete search history.

(56) References Cited

U.S. PATENT DOCUMENTS

| | | | | |
|---|---|---|---|---|
| 3,885,071 | A | * | 5/1975 | Blad et al. ................. 428/60 |
| 4,015,035 | A | * | 3/1977 | Blad et al. ................. 428/60 |
| 4,565,595 | A | | 1/1986 | Whitener |
| 4,741,943 | A | | 5/1988 | Hunt |
| 5,567,535 | A | * | 10/1996 | Pettit ........................ 428/608 |
| 5,951,800 | A | * | 9/1999 | Pettit ........................ 156/157 |
| 6,190,484 | B1 | | 2/2001 | Appa |
| 6,908,526 | B2 | | 6/2005 | Bequet |
| 7,115,323 | B2 | * | 10/2006 | Westre et al. ............. 428/593 |
| 2005/0077427 | A1 | * | 4/2005 | Brenner et al. .......... 244/117 R |

FOREIGN PATENT DOCUMENTS

| | | |
|---|---|---|
| EP | 0248161 A2 | 12/1987 |
| EP | 0353672 A2 | 2/1990 |
| WO | WO2004011169 A2 | 2/2004 |

OTHER PUBLICATIONS 1 page from www.engineeringtoolbox.com/young-modulus-d_417.html referencing the known Young's Modulus of Aluminum.*
PCT Invitation to Pay Additional Fees for Application No. PCT/US2007/008695, dated Jun. 3, 2008, 9 pgs.

* cited by examiner

*Primary Examiner*—Benjamin P Lee

(57) ABSTRACT

Embodiments of integral composite panels and joints for composite structures are described In one implementation, an integrated panel spanning substantially the entire wingspan of an aircraft, includes at least a center portion and a pair of outwardly projecting wing portions. The portions may include a skin formed from successive layers or plies of composite material which overlap and offset at the joint between respective sections creating a pad-up area to carry loads between the portions. In a particular implementation, the skin is laid over one or more structural stringers which are transitioned into the joints between sections such as by tapering of the thickness and/or stiffness of the stringer.

20 Claims, 5 Drawing Sheets

COMPOSITE WING-BODY JOINT

FIELD OF THE INVENTION

This invention relates to devices and techniques for aerodynamic structures of composite construction and more specifically, to novel, improved integrated composite wings and wing-to-body joints.

BACKGROUND OF THE INVENTION

In manufacturing of an aircraft, aerodynamic structures such as wing panels are joined to the fuselage or to other structures of the aircraft. Traditionally, mechanical butt joints are used in which a portion of the wing may be butted up to a portion of the fuselage and joined via mechanical joints, using bolts, rivets and devices such as ribs and so forth. In these traditional butt joints, the bolts and ribs of the joint are used to meet the bearing requirements for the joint. Thus, sufficient bolts and other mechanical fastening devices must be used to meet the bearing allowable for the material used in the aircraft design.

Mechanical joints, particularly those with many bolts, may be very heavy which corresponds to more aircraft weight and increased operational cost. Further, production cost associated with mechanical joints may be significant because the joints are formed separately from the joined panels which takes up production time (labor, equipment and so forth) and the joints include many different parts (ribs, bolts and so forth) which must also be fabricated. In addition, bolted joints may experience fatigue over the long term and accordingly must analyzed periodically, maintained and replaced, further increasing operational costs. Thus, although desirable results have been achieved using traditional joints for aerodynamic structures, there is room for improvement.

SUMMARY OF THE INVENTION

Integral composite panels and joints for composite structures, such as for wings of a composite aircraft, are described In one implementation, an integrated panel spanning substantially the entire wingspan of the aircraft, includes at least a first portion and second portions integrally formed one to another. The portions include successive layers or plies of composite material, and may be joined to a framework including stringers, ribs and spars. The plies may extend substantially along the length of the portions, and overlap in an interwoven pattern with plies of the adjacent portion proximate to a joint where the portions meet the fuselage (bodyline). The overlapping creates a build-up area or pad-up of the thickness which is utilized to carry loads across the joint and to meet the bearing specifications for the joint. The bearing capability of the pad-up permits fewer mechanical or bolted joints to be used which results in a lighter weight structure.

BRIEF DESCRIPTION OF THE DRAWINGS

Embodiments of the present invention are described in detail below with reference to the following drawings.

DETAILED DESCRIPTION

The present invention relates to aerodynamic structures such as composite wings and tails and wing-to-body joints. Many specific details of certain embodiments of the invention are set forth in the following description and in FIGS. 1-5 to provide a thorough understanding of such embodiments. One skilled in the art, however, will understand that the present invention may have additional embodiments, or that the present invention may be practiced without several of the details according to the following description. For instance, while certain embodiments reference composite wing structures for an aircraft, it may be appreciated by those of skill in the art that the techniques described may be applied in a variety of aerodynamic structures.

Figure 1:
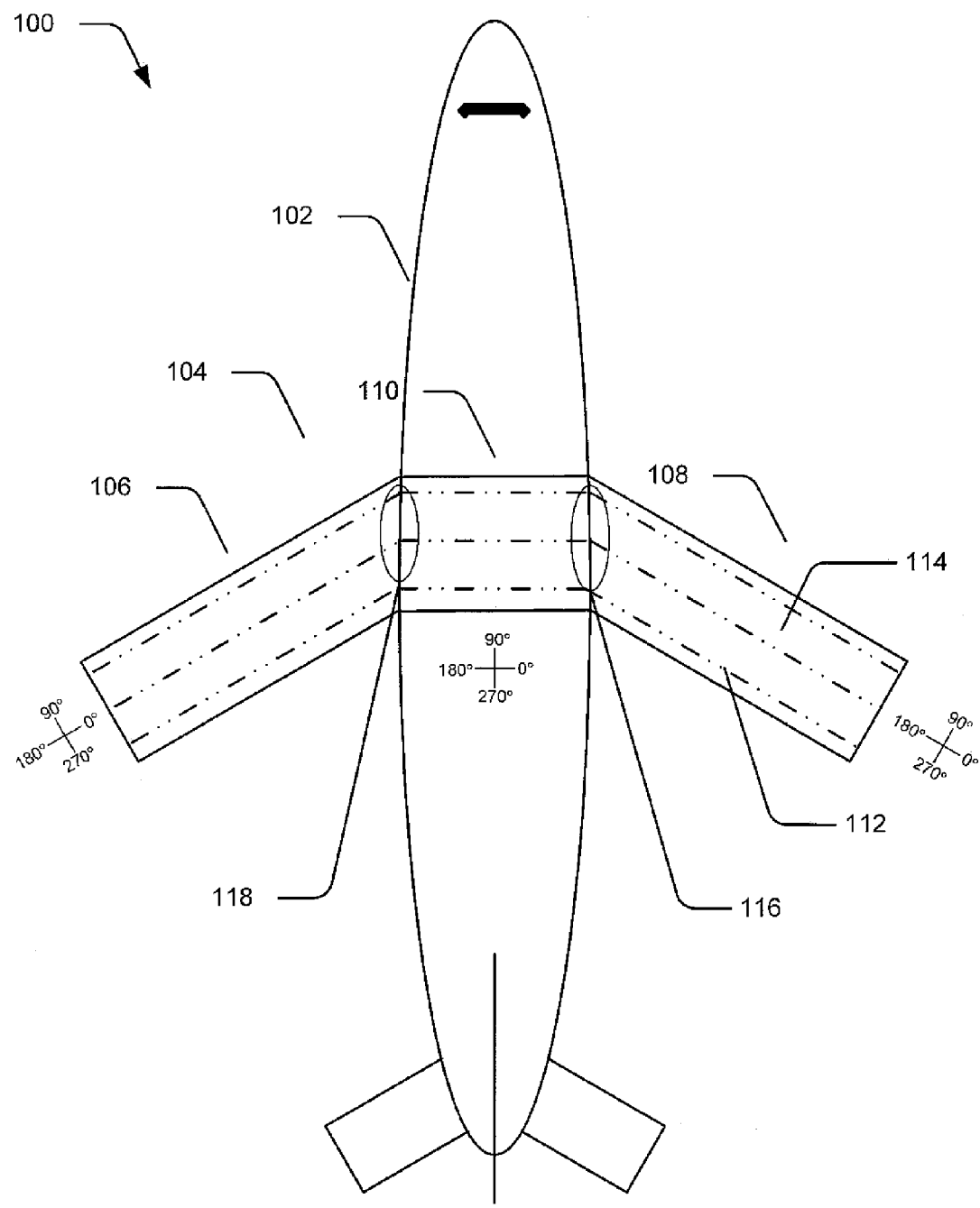
FIG. 1 illustrates a schematic overhead view of an aircraft having a composite wing structure and wing-body joints formed in accordance with an embodiment of the present invention.

FIG. 1 illustrates an aircraft 100 in accordance with an embodiment of the present invention. In this embodiment, the aircraft 100 includes a fuselage 102 which is joined to a composite wing structure 104. The composite wing structure 104 includes three portions, two wing portions 106, 108 extending laterally outward from the fuselage 102, and center portion 110 spanning the fuselage 102. The three portions 106, 108, 110 define three associated coordinate systems, one for each of the wing portions 106, 108 and another for the center portion 110. A zero degree axis is defined for each portion which runs substantially along the length of each wing portions and across the center panel (e.g., across the fuselage 104) transverse to the longitudinal axis of the aircraft. Positional references will be made from time to time herein relative to the coordinate system and zero degree axes defined for each portion. It is noted that certain features of aircraft 100 are omitted for clarity. For instance, the wing portions 106,108 may be coupled to a leading edge portion, trailing edge portion, wing tips and other members which are not shown.

The composite wing structure 104 is made up of one or more composite panels. In an implementation, the composite wing structure 104 may be a single integrally-formed panel, for instance substantially from wing tip to wing tip. A plurality of structural members (e.g., stringers, spars, and ribs) forms a skeletal like structure (such as a framework) which is overlaid with composite material skin 114 to form the composite panel. In the depicted illustration, the positions of exemplary stringers are represented by lines 112 shown as running substantially along the length of the wings 106,108 and across the center portion 110. The stringers 112 may be metal (e.g. aluminum, titanium and so forth) or composite (e.g., carbon fiber, graphite, and the like) beams configured to receive and support the skin 114. The skin 114 may be formed by laying up successive layers or plies of composite material (e.g., composite tape, metal foils, fibrous materials and the like) to form the skin which may then be fastened to the stringers 112 and/or other structural members. The skin 114 may also be formed from plies of a variety of materials. In an implementation, the plies are formed from a fibrous tape having fiber or filament oriented along the length of the tape. For instance, light weight material such as carbon fiber graphite tape, metal fiber tape, foils or other material suitable for plies of an aerodynamic structure may be employed. Further, each ply may be made up a plurality of strips of composite material or tape, further discussion of which may be found in relation to FIG. 3.

Respective side-of-body joints 116, 118 are illustrated coincident with each side of the fuselage 102 or body-line of the aircraft 100. These side-of-body joints 116, 118 occur where the composite wing structure 104 is joined to the fuselage, and where the wing portions 106, 108 and center portions 110 meet at the sweep angle. In this embodiment, the center portion 110 is oriented to be substantially transverse to the longitudinal axis of the fuselage 102. The wing portions 106, 108 are depicted here as swept back in an approximately 30 degree sweep angle relative to the center portion 110. While a 30 degree sweep is illustrated in FIG. 1, it is noted that a variety of sweep angles, including a sweep angle of zero degrees, or even a forwardly swept sweep angle, may be employed. More particularly, it is contemplated that the techniques described herein may be employed to produce composite aerodynamic structures and/or wings with any desired sweep angles (rearwardly swept, forwardly swept, or no sweep), which in accordance with the inventive principles described herein have improved side of body joints of reduced weight and which may be utilized to transfer loads between the wing portions 106,108 and fuselage 102.

In an implementation, a plurality of portions of a composite wing structure 104 aircraft 100 are integrally formed one to another via interleaved plies of composite material at an interface between the portions. For instance, in the areas of the composite wing structure 104 corresponding to the location of the side of body joints 116, 118, successive layers of plies running along the wing portions 106, 108 are interleaved with plies of the center section 110 running transverse to the longitudinal access of the aircraft. In particular, center section 110 is integrally joined via a plurality of interleaved plies along one side to the left wing portion 106 and along an opposite side integrally joined to the right wing portion 108. In alternate embodiment, the center portion 110 may be omitted such that the composite wing structure includes the wing portions 106, 108 which are integrally joined one to the other via interleaved plies of composite material at an interface between the portions. The interface between wing portions 106, 108 in this embodiment may occur substantially along the center line of the aircraft.

The interleaving of the plies permits loads to be transferred between the portions (e.g., in particular, loads from the wing portions 106, 108 to the center portion 110. Further, the interleaving creates a natural pad-up (increase in gage or thickness) area on the composite wing structure 104 at locations corresponding to the side of body joints 116, 118 that increases the bearing capability of the composite wing structure 104 (e.g., the laminate itself bears the load). Axial loads, kick loads and the like are transferred between wing portions 106, 108 and the center portion 110 and fuselage 102 via the integrally formed pad-up regions of the skin rather than through bolts of a traditional side-of-body joint. Thus, fewer and/or smaller bolts or other fasteners may be used in the side-of-body joints 116, 118 and correspondingly the weight of the aircraft 100 may be reduced. Further, the risk associated with bolted joint fatigue may be avoided or reduced by the uses of fewer bolted joints.

The interleaving may be implemented by overlapping and/or offsetting of successive layers of plies, further discussion of which may be found in relation to FIGS. 3 and 4 below. Further, to compensate for the pad-up created by the interleaving, the composite wing structure 104 may include stringers 112 which run-out or transition into the side-of-body joints 116, 118 such as by tapering down of the material and/or stiffness as the stringers approach the side-of-body joints 116,118. Further discussion of transitioning stringers which may be found in relation to FIGS. 3 and 5 below.

Figure 2:
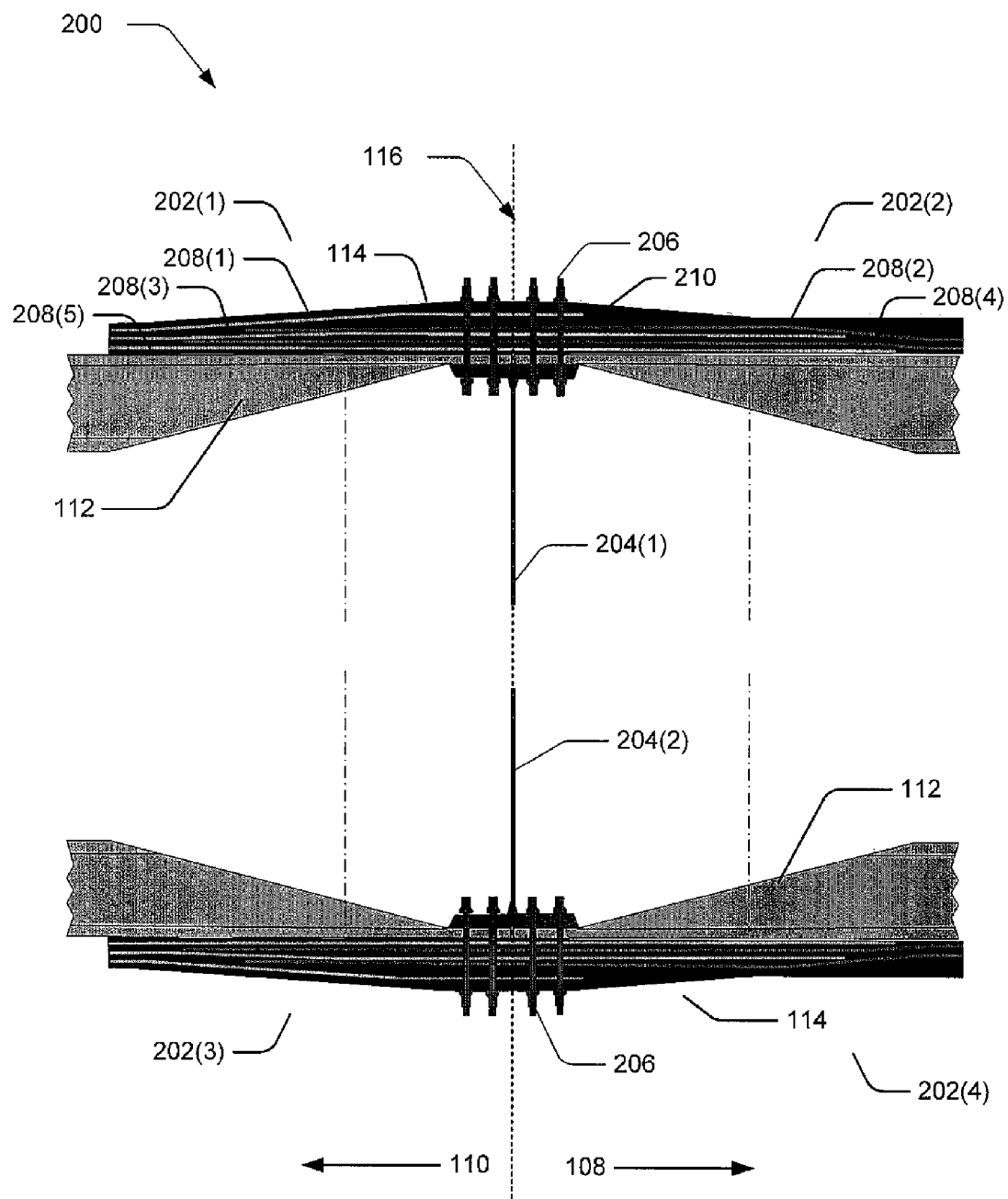
FIG. 2 illustrates an exemplary implementation showing a cross-sectional view of a portion of the composite wing body joint shown in FIG. 1

FIG. 2 illustrates an implementation 200 showing a cross sectional view of an exemplary side-of-body joint 116 of FIG. 1 (viewed along a forward-looking line approximately parallel to a longitudinal axis of the fuselage 102). The side-of-body joint 116 occurs at the interface (dashed line) between the center portion 110 and the right wing portion 108 depicted in FIG. 1. FIG. 2 illustrates an upper portion of joint 116 between an upper inner portion 202(1) on the center portion side 110 of the joint 116 (e.g., inside the fuselage) and a 202(2) upper outer portion on the wing 108 side of the joint 116 (e.g., outside the fuselage). Similarly, a lower portion of joint 116 is depicted between a lower inner portion 202(3) and a lower outer portion 202(4) corresponding to the center portion 110 and wing portion 108 respectively. Naturally, the joint 118 of FIG. 1 may be similarly configured between center portion 110 and left wing portion 106, and together the joints 116, 118 produce the composite wing structure 104 depicted in FIG. 1. The side-of-body joints 116, 118 as previously noted may be employed to join a composite wing structure 104 or integrally-formed panel section to the fuselage 102. Naturally, two wing portions 106, 108 may be similarly joined along an interface between the portions when the center portion 110 is omitted.

The upper and lower portions of joint 116 are depicted being implemented via respective side-of-body ribs 204(1), 204(2). The ribs 204(1), 204(2) extend along the fuselage (the body line) in the area of the side-of-body joint 116 and act as attachment points to form the joints (such as joint 116) which joins a composite structure 104 to the fuselage 102 in accordance with the present disclosure. Ribs 204(1), 204(2) for instance may be fastened by bolts, rivets or other suitable fasteners to the fuselage and to the respective structure being joined (e.g., wing portions 108 and center portion 110 in FIG. 2). In a particular implementation, the pair of ribs 204(1), 204(2) may be portions of a common attachment mechanism. A plurality of bolts 206 are depicted in FIG. 2 as joining respective portions of the composite structure 104. While ribs 204(1), 204(2) are depicted, a variety of metal and/or composite attachment points suitable for joining aerodynamic structures are contemplated.

As previously described, the respective portions 202(1)-202(4) of the composite structure 104 may be forming a skin 114 having successive layers or plies of composite and fastening the skin 114 to an internal structure including a plurality of stringers 112 exposed in the cross sectional view of FIG. 2. The skin 114 may be fastened or joined to the structure in a variety of ways, such as by adhesive, rivets, bolts or combinations thereof, and other suitable fastening devices. Stringers 112 may run axially substantially along the zero degree axes of respective portions 110, 108 previously described. It is noted that the stringers 112 are depicted as tapering down or transitioning into the joint 116. In other words, the thickness of the stringers becomes progressively narrower as they approach the interface of the joint 116.

In traditional techniques the width of the stringer may be maintained (e.g. not tapered) in the area of a joint. This requires undesirably large and heavy bolts, ribs or attachment points, and the like in order to produce a joint that runs through the stringers. In such traditional approaches, it is the bolting arrangements that are primarily used to transfer loads between structures (e.g., wings to fuselage) and to meet the majority of the bearing requirements for the joint. However in accordance with the present techniques, the natural pad-up area of the interleaved composite skin 114 is used to transfer loads and to meet specified design requirements for bearing. Since the bolts 206 are not primarily used in designing the bearing capabilities of the joint 116, the stringers 112 may be tapered as presently described to minimize the number and size of the attachment mechanisms required and accordingly to save considerable weight. The bolts 206 of the joint 116 may bear some load placed on the joint 116, for instance kick loads, however in accordance with the inventive principles described herein, it is the interleaving composite (rather than the bolts 206) which is the primary design consideration for bearing and load transfer purposes. The bolts 206 may be in the range of 60-80% smaller and/or fewer than those for similar structures designed without the composite body-wing joint techniques described herein. Further discussion of the transitioning of stringers 112 may be found in relation to FIG. 5.

The skin 114 for each of the upper and lower portions of the joint 116 is depicted as produced by a plurality of successive layers or plies (referred to collectively as plies 208) built up or laminated one over the next. The skin 114 may then be fastened to structural components such as the depicted stringers 112. The plies 208 may be of composite material such as fibrous graphite tape or other suitable skin or laminate material for aerodynamic structures. Exemplary plies 208(1)-208(5) forming the skin 114 in the upper portion of joint 116 are illustrated in FIG. 2. For instance, plies 208(1), 208(3) and 208(5) form the center portion 110 and may extend across the center portion 110 to the left side joint 118 of FIG. 1. Plies 208(2) and 208(4) form the wing portion 108 and may extend to the wing tip. In this embodiment, the plies 208 meet at the joint 116 in a sweep angle. In an implementation plies 208 are oriented along the zero degree axes of respective portions 110,108. Thus plies 208(1), 208(3) and 208(5) may be considered zero degree plies of the wing portion 110 and plies 208(2) and 208(4) zero degree plies of the wing portion 108. While zero degree plies are described, it is noted that the plies may actually be oriented in a variety of angles near parallel to the zero degree access of a portion. Near zero degree plies as used herein refers to plies arranged to be within plus or minus 15 degrees of oriented with (e.g., parallel to) the zero degree axes of a respective component.

As noted previously, the plies 208 may be interleaved at the joint area. In an implementation the interleaving includes an overlapping pattern in which the zero degree plies of the center portion 110 overlap with the zero degree plies of the wing portion 108. FIG. 2 for example depicts an exemplary overlapping pattern in which plies from the center portion 110 alternate with plies from the wing section 108 one for one. More specifically, ply 208(1) extends across the joint 116 and overlaps ply 208(2) which similarly extends across the joint, and so on in a repetitive pattern for plies 208(3)-208(5). The plies 208(1)-208(5) depicted in FIG. 2 are representative of numerous such plies 208 which may be used and overlapped in the described manner to integrally form the skin 114 in the area of the joint 116. For instance, skin 114 may include any suitable number of plies 208 (e.g. 50, 100, 500, etc.). Naturally a variety of other patterns may also be employed, such as overlapping every two plies, every 5 plies, overlapping at a non-constant interval, and so forth.

The overlapping causes the natural pad-up region 210 to be formed at the joint 116. The pad-up region 210 (or gage increase) correspondingly increases the stiffness, bearing capability, load transference and so forth of the composite layering. In particular the overlapped zero degree plies 208(1), 208(3), 208(5) or near zero degree plies from the center portion 110 act as shear plies in the wing portion 108 and correspondingly the overlapped plies 208(2), 208(4) from the wing portion 108 act as shear plies in center portion 110. Bolts 206 or other suitable fasteners are run through the pad-up region 210 to join the upper inner 202(1) and upper outer 202(2) portions to the rib 204(1). Additional details regarding the overlapping of plies are described with respect to FIG. 3 below.

The plies 208 in FIG. 2 are also depicted as having offset end points. For instance, plies 208(1), 208(3), 208(5) of the center portion 110, rather than end at a common point, are illustrated having different respective end points. Plies 208(2), 208(4) of the wing portions 108 similarly have unique or offset end points. The offset end points are used to produce a gradual, rather than steep or sharp build-up of the layers for the pad-up 210. Additional details regarding the offset of plies are described with respect to FIG. 4 below.

Figure 3:
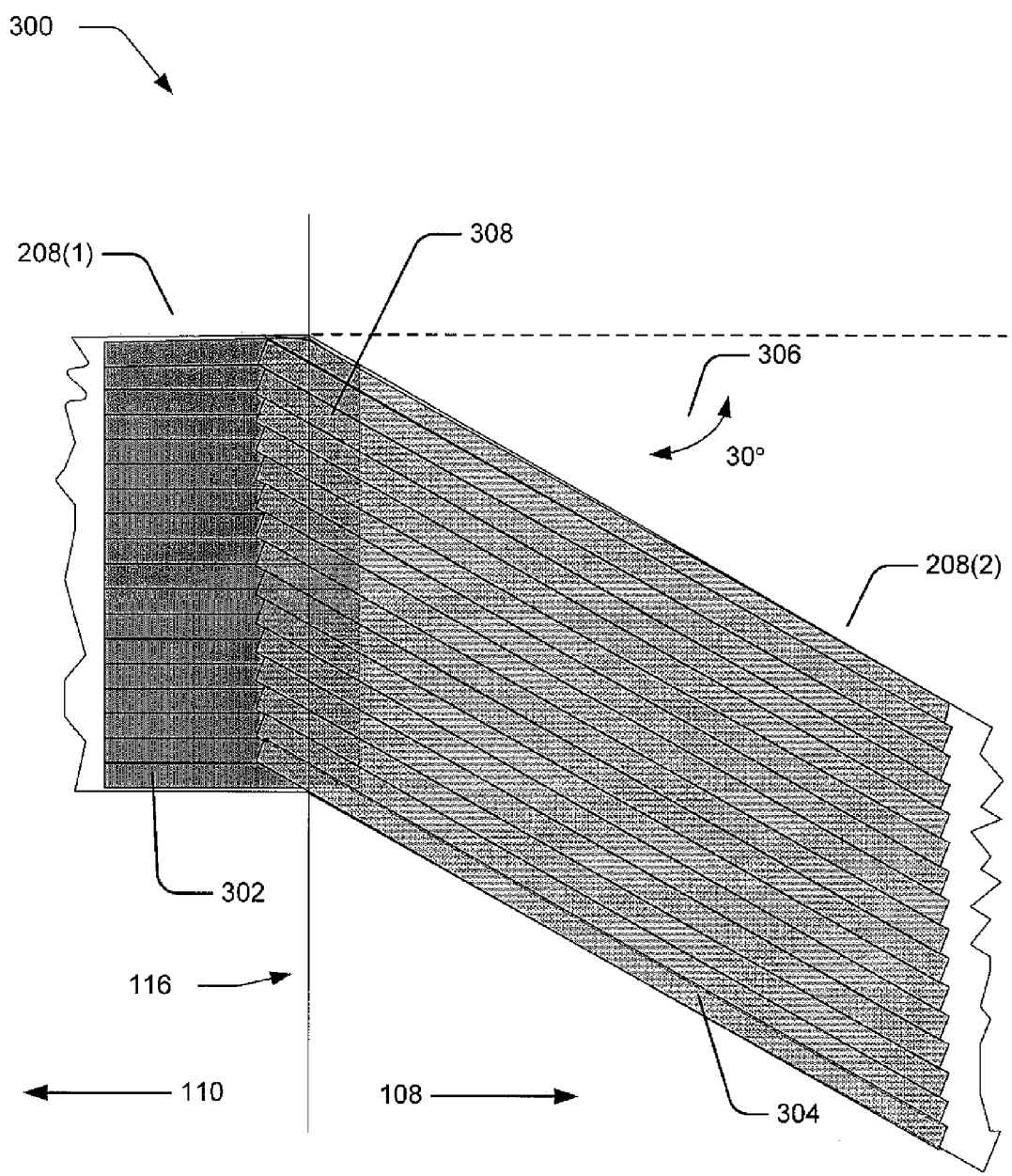
FIG. 3 illustrates overlapping plies of a composite wing body joint of FIG. 2 in greater detail.

Reference is made now to FIG. 3 which depicts overlapping plies of FIG. 2 in greater detail. In particular, FIG. 3 depicts an overhead view of plies 208(1), 208(2), such as from above the aircraft 100 of FIG. 1. FIG. 3 further illustrates the plies as each being formed from a plurality of strips 302, 304 arranged across the width of respective portions 110, 108. The strips may be, for instance, tape strips formed from composite material, such as a carbon fiber or graphite tape, and may have a variety of widths, some examples of which are 3 inches, 6 inches, 10 inches, and 12 inches. The strips 302, 304 extend across respective portions 110, 108 such that the strips 302, 304, and accordingly the plies 208(1), 208(2) formed via the strips, are oriented lengthwise along the zero degree axes of respective portions 110, 108. The plies intersect at a sweep angle 306 which as depicted is approximately 30 degrees. Thus, the sweep angle is defined by the relative relationship between the zero degree axes of the center portion 110 and wing portion 108. As noted previously a variety of different sweep angles are contemplated.

Plies 208(1), 208(2) are depicted as overlapping in a region 308 across at the joint 116 which corresponds to and along with successive plies form the pad-up 210 of FIG. 2. As noted, in this arrangement the ply 208(1) oriented to the zero degree axis of the center portion 110 acts as a shear ply via the overlap 308 in the wing portion 108. Conversely the ply 208(2) oriented to the zero degree axis of the wing portion 108 acts as a shear ply via the overlap 308 in the center portion. Numerous overlapping plies 208 may occur in each of the upper and lower portions at a location corresponding to joint 116 and also to the opposite side joint 118. A complete and integrated panels from wing tip to wing tip may be formed for either or both of the upper and lower panels of composite structure 104 via the composite-wing body techniques and methods described. Further, a complete and integrated composite structure 104 (having integrated upper and lower panels) from tip to tip may also be formed. Smaller integrated portions may also be formed such as separate left side and right side panels, separate upper and lower panels and various other combinations. Joints such as side-of-body joints 116, 118 may then be utilized to join the integrally formed structures or panels to the aircraft.

Figure 4:
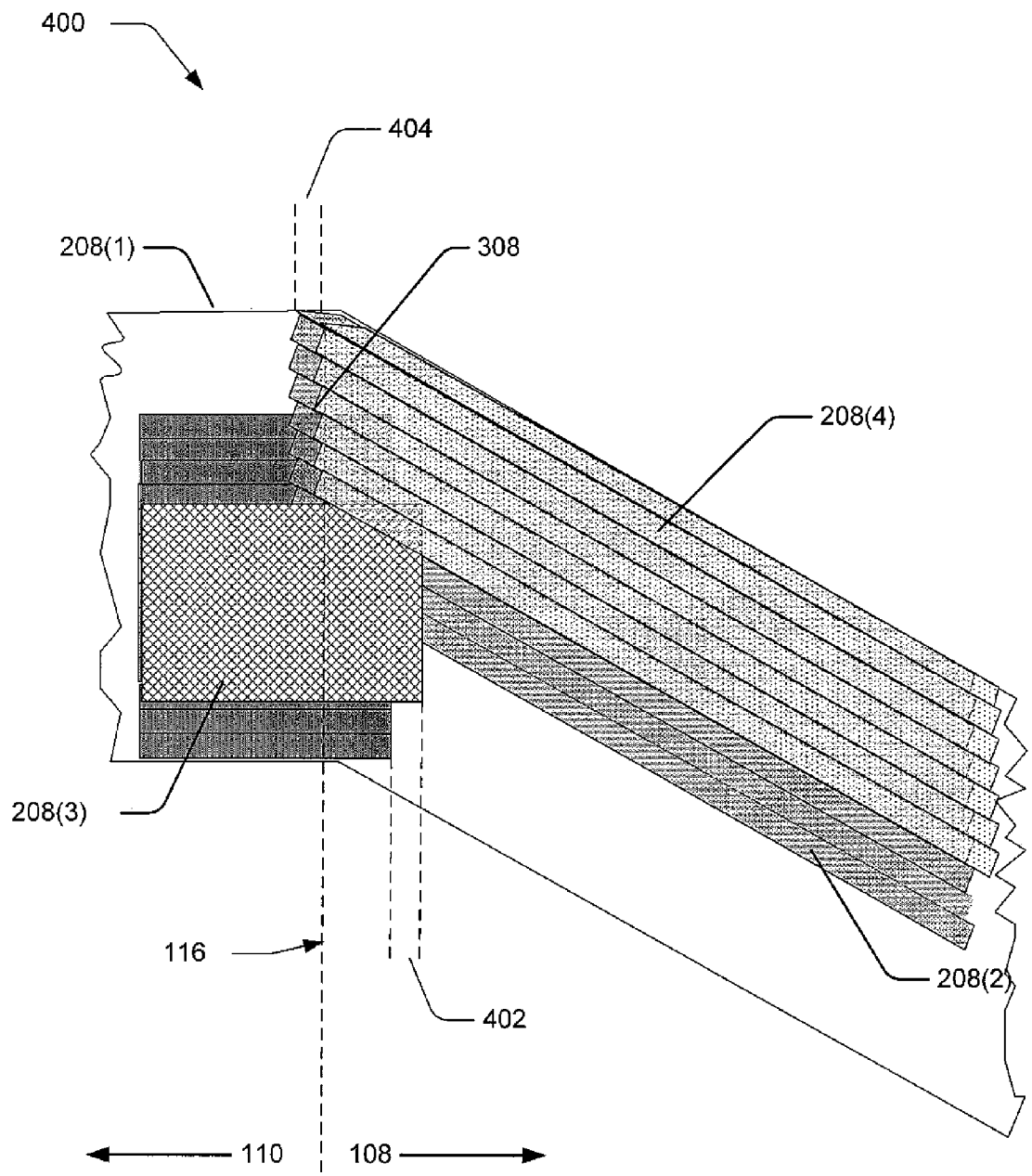
FIG. 4 illustrates offset plies of a composite wing body joint of FIG. 2 in greater detail.

Reference is made now to FIG. 4 which depicts an implementation 400 showing the offset and overlapping plies in greater detail. More specifically, FIG. 4 depicts plies 208(1) and 208(2) which overlap in the region 308 as described in FIG. 3 It is noted that some of the strips 302, 204 have been removed for clarity. A portion of another ply 208(3) is depicted as overlaid over the plies 208(1), 208(2). Ply 208(3) corresponds to the center portion 110 and is oriented approximately parallel to the respective zero degree axis. Ply 208(3) may also be arranged in as a near zero degree ply within plus or minus 15 degrees of the zero degree axis. It is noted that ply 208(3) overlaps ply 208(2) of the wing portion 108 in a manner similar to the overlap of plies 208(1), 208(2) described with respect to FIG. 3. Thus, the overlap of plies in implementation 400 is in accordance with the alternating overlap previously described with respect to FIG. 2. In addition, FIG. 4 illustrates an offset 402 created between the respective endpoints or cut-offs between plies 208(1) and 208(3) by the arrangement of the plies.

FIG. 4 further depicts a portion of another ply 208(4) overlaid over the plies 208(1), 208(2), and 208(3). Ply 208(4) in this implementation corresponds to the wing portion 108 and is oriented approximately parallel to the respective zero degree axis. Ply 408(4) overlaps the plies 208(1), 208(3) of the center portion. Further an offset 404 is created between the respective endpoints or cut-offs between plies 208(4) and 208(2) by the arrangement of the plies.

As previously described, the offsets 402, 400 of plies in the joint are added in order to produce a gradual step-up in thickness in the pad-up 210. A variety of different offsets may be selected to correspond to a desired pad-up 210, for instance to achieve a desired increase in gage over a desired distance (e.g., desired pad-up). Further, the offsets for different respective plies may be selected to be constant for each ply or may be varied between different plies or between plies of respective portion 110, 108. In various embodiments, offsets in the range of about 0.25-1.25 inches are selected to produce the desired pad-up, however smaller or larger offsets may be used in other implementations. It is further noted that the offset pattern may be repeated after a certain number of plies have been laid. As an example, after 20 plies are overlaid, the offset pattern could be repeated, thus if 60 plies total are used, then 3 plies may end at each of 20 respective end point locations.

Figure 5:
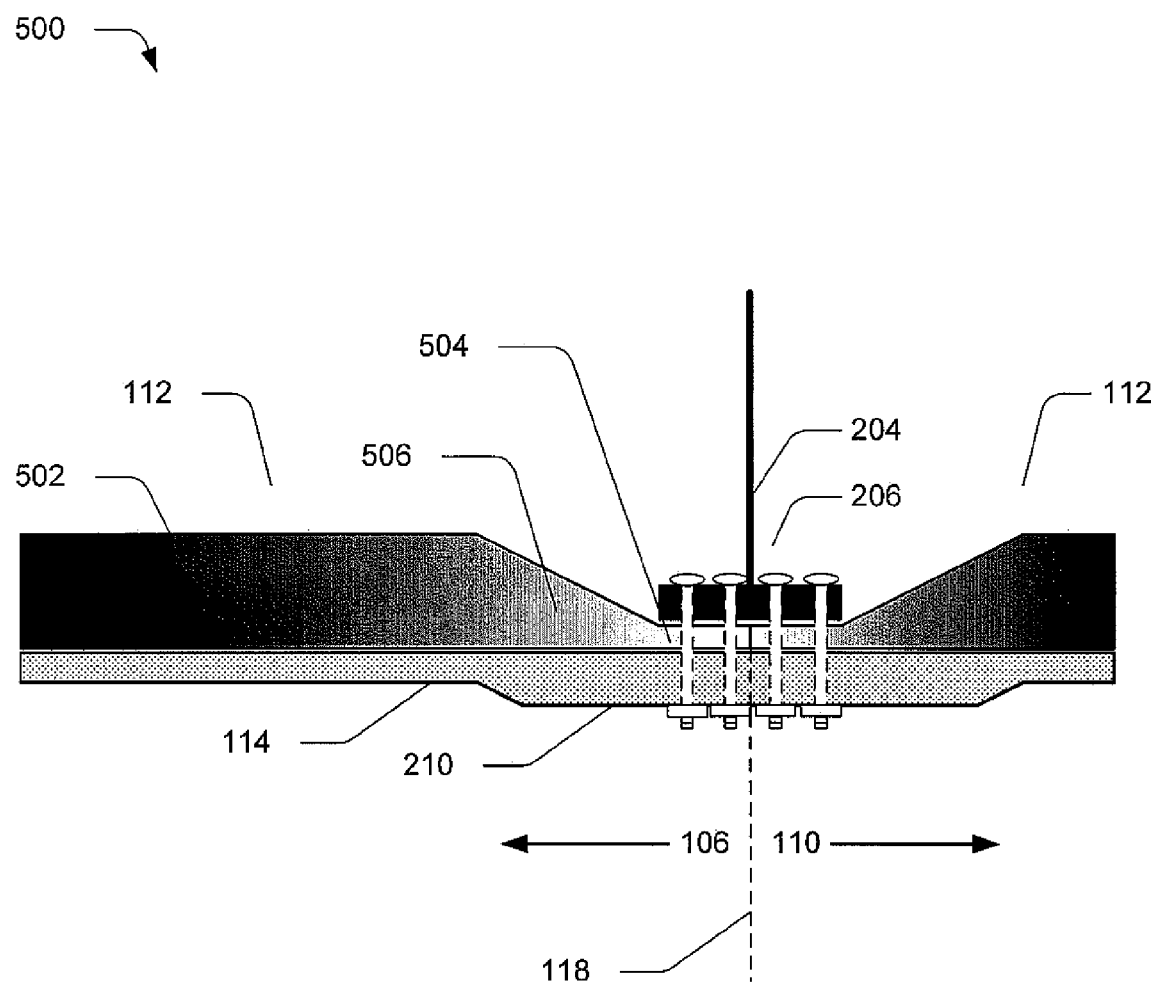
FIG. 5 illustrates an exemplary implementation of a stringer in accordance with the present invention.

FIG. 5 depicts an implementation 500 showing a detailed view of a stringer transitioning into a joint region. A cross sectional view of a left side of body joint 118 located between the left wing portion 106 and the center portion 110 is depicted. In particular, the lower half of the wing portion 106 is depicted which corresponds to the underside of the wing (e.g., a lower outer portion on the wing side 106 joined to a lower inner portion on the center side 110. The outer portion of the panel (e.g., wing portion side 106 of joint 118) includes a stringer 112 to which a skin 114 has been joined. A portion of a corresponding stringer 112 from the center portion 110 is also shown. The skin 114 may be formed from successive plies 208 which as previously described may overlap and offset with plies 208 from the center section 110 to form the pad-up region 210 illustrated in FIG. 5. Thus, an integrated panel section may be formed via the overlapping and offsetting plies 208. The integrated panel (e.g., integrally formed portions 106, 108) including the stringers 112 and skin 114 are depicted as being joined at the joint 118 to a side-of-body rib 204 via bolts 206 extending through the portions 106,108 at the interface in pad-up region 210.

In the implementation shown in FIG. 5, the stringer 112 is illustrated as transitioning or tapering into the joint area 118. In particular the stringer 112 is depicted as tapering axially along the stringer between a region 502 of relatively higher thickness or gage and a narrower region 504 having lower thickness, e.g. where the stringer 112 is attached to the rib 204 via bolts 208. As previously noted, this transitioning or tapering permits fewer and/or smaller bolts 208 to be used to perform the joining. A transition region 506 is shown in which the stringer 112 becomes progressively narrower moving from the region 502 to the region 504. In this embodiment, a linear transition, such as at a constant 45 degree angle or other angle, is depicted. In a further embodiment, such linear tapering is employed over about 40 to 50 inches leading into the joint region 118. In other embodiments, other suitable the transition regions 506 may be employed such as corresponding to a variety of linear angles, a curvilinear path, stepped path, and so forth. This transition or tapering of the stringers 112 accordingly may occur over a variety of distances along the stringers 112.

The corresponding stringer 112 from the center portion 110 may similarly be transitioned. Each of portions 106, 110, 108 may have a plurality of stringers 112 one or more of which may be the transitioning stringers 112 described herein. In an implementation, the tapering of the stringers 112 occurs roughly in the same area in which the pad-up region 210 of the skin 114 occurs. In other words, the transition region 506 and the pad-up region 210 may occur substantially at the same position along the length of a respective portion 106, 110. In this manner the build-up of the pad-up region 210 is compensated for in whole or in part by the tapering or transitioning of the stringers 112.

In an implementation, the stiffness of the stringer 112 may be varied along the length of the stringer 112. This stiffness reduction or softening may be employed in addition to (or in lieu of) the tapering of the stringer thickness. For instance, the stringers 112 may be formed of a composite laminate in which the laminate material is varied across the length of the stringer 112. In particular, towards the region 502 depicted in FIG. 5 there may be a relatively higher stiffness material and the selected material or lay-up of the stringer varied to progressively reduced stiffness or softened the stringer 112 along the length traveling from region 502 to region 504 near the joint 118. This stiffness reduction again is employed to compensate for the corresponding stiffness increase which is achieved by the build up of plies 208 in the pad-up region 210. Further, the softening of the stringers 112 may act to absorb and reduce the effects of peel loads created from the load transference via shear action of the overlapping plies 208 in the pad-up 210, e.g., the softening may permit more deformation of the stringer 112. A combination of materials having a variety of stiffness or tensile modulus may be used to produce the desired variance of stiffness along a stringer 112. Additionally or alternatively, the stiffness or modulus may be varied by changing the fiber alignment or orientation of the material or composite from which the stringers are produced. In an implementation, the stringer 112 is configured to include carbon fiber material of varying tensile modulus measured in million pounds be square inch (MSI) such that the stiffness is varied along the length of the stringer 112 in the range of about 16 MSI to 2 MSI moving from the region 502 to region 504 near the joint 118. A variety of other materials, such as metal foil, titanium, aluminum, composite tapes, laminates and other suitable stringer materials are also contemplated.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A composite wing panel, comprising:
a frame including a first portion and a second portion that are joined at an interface;
composite skin covering the frame, the skin including a plurality of plies of composite material, at least a portion of the plurality of plies of the first and second portions arranged in an overlapping pattern across an interface between the portions, thereby integrally forming a laminate skin over the interface;

wherein the frame includes a plurality of stringers that transition into the interface, the stringers tapered in at least one of height and stiffness as they approach the interface.

2. A composite wing panel according to claim 1, wherein the overlapping pattern includes a non-symmetrical pad-up in the thickness of the skin proximate the interface between the portions, the pad-up being configured to transfer loads across the interface.

3. A composite wing panel according to claim 1 wherein, the plurality of plies from each portion includes a plurality of near zero degree plies arranged lengthwise along a zero degree axis of the respective portion and the overlapping pattern includes overlapping of the near zero degree plies of the first portion with the near zero degree plies of the second portion.

4. A composite wing panel according to claim 1 wherein the interface includes a side-of-body rib; and a plurality of reduced-size bolts for attaching a tapered portion of one of the tapered stringers to the rib.

5. A composite wing panel according to claim 1, wherein the frame includes a center portion, a first wing portion, and a second wing portion, and wherein:
the center portion is configured to extend across an aircraft fuselage such that a zero degree axis of the center portion is substantially transverse to a longitudinal axis of the fuselage;
the first and second wing portions are integrally formed to the center portion on opposing sides of the center portion and are swept with respect to the center portion such that a zero degree axis corresponding to each wing portion is arranged at a relative sweep angle with respect to the zero degree axis of the center portion;
each of the first and second wing portions and the center portion includes a plurality of near zero degree plies arranged approximately lengthwise along the zero degree axis of the respective portion; and
the overlapping pattern includes overlapping of the near zero degree plies of the center portion with the near zero degree plies of each wing portion, such that one or more pad-ups in the thickness of the skin are produced between the center portion and each wing portion.

6. The composite wing panel according to claim 5, wherein the overlapping of the near zero degree plies of the wing portions with the near zero degree plies of the center portion occurs at the respective sweep angle such that the near zero degree plies of each wing portion, when subject to a load, act as shear plies in the center section to transfer at least a portion of the load to the center section via the angular shear between the overlapping plies.

7. A composite wing panel according to claim 1, wherein the stringers are tapered in stiffness as they approach the interface.

8. The composite wing panel according to claim 1, wherein endpoints of the plies from each portion are offset from one from another such that the pad-up occurs gradually.

9. The composite wing panel according to claim 1, wherein the stringers transition from a region of relatively high thickness to a region of relatively lower thickness proximate to the interface between the portions.

10. An aircraft, comprising:
a fuselage;
a composite wing structure joined to the fuselage, the wing structure including a frame that forms a center portion spanning the fuselage and a plurality of wing portions extending laterally outward from the fuselage;
wherein the plurality of wing portions are integrally formed to the center portion via a plurality of interleaved composite plies; and
wherein the frame includes a plurality of stringers that transition into interfaces of the portions, the stringers tapered in at least one of height and stiffness as they approach the interfaces.

11. The aircraft according to claim 10 wherein at least some of the plurality of plies are formed from one or more strips of carbon fiber tape extending approximately lengthwise along each portion; the overlapping pattern includes an alternating pattern such that plies from the first portion alternate with plies from second portion across the interface; the overlapping pattern includes a pad-up in a thickness of the skin at the interface between the portions; the endpoints of the plies from each portion being offset one from another such that the pad-up occurs gradually; and the pad-up is configured to be positioned proximate an outer surface of a fuselage when the integrally formed portions are coupled to the fuselage, the pad up being configured to be coupled to the fuselage and to transfer loads across the interface between the portions.

12. The aircraft according to claim 10, wherein:
the plurality of interleaved plies includes a plurality of plies arranged approximately axially along a zero degree axis associated with each of the portions; and
the interleaving includes:
overlapping of the zero degree plies of each of the wing portions with the zero degree plies of the center portion to form an area of increased thickness proximate to an intersection of each wing portion with the center portion; and
offsetting the endpoints of the overlapping plies of each portion in the area of increased thickness to build the thickness gradually.

13. The aircraft according to claim 12, wherein the offset of the endpoints is within a range of about 0.25 inches to about 1.25 inches per ply.

14. The aircraft according to claim 12, wherein the interfaces include side-of-body joints joining the composite wing structure to the fuselage, wherein:
each intersection of the center portion with one of the plurality of wing portions occurs substantially along a body line of the fuselage on a respective side of the aircraft, such that the corresponding area of increased thickness formed extends along the body line;
each of the side-of-body joints being proximate to a respective one of the intersections and coupled to the composite wing structure through the corresponding area of increased thickness; and
the areas of increased thickness being configured to bear loads transferred between the plurality of wing portions and the center portion.

15. The aircraft according to claim 12, wherein:
each of said wing portions comprise swept wing portions, each swept wing portion including a plurality of stringers extending lengthwise substantially parallel to the zero degree axis of the respective portion;
the plurality of stringers are configured to receive and support the corresponding plurality of interleaved composite plies; and
at least one said stringer corresponding to one said portion is configured to have tapering stiffness along the length of the stringer such that the stringer transitions from a region of relatively high stiffness to a region of relatively lower stiffness approaching an end of the stringer located proximate to one said area of increased thickness.

16. A composite panel, comprising:
a first section and
a second section coupled to the first section at an interface via a plurality of composite plies arranged axially along a zero degree axis of each first and second section, the plurality of plies of the first section being interleaved with the plurality of plies of the second section; and
a framework coupled to the first and second sections and having a plurality of elongated stringers arranged to run lengthwise along each said section, one or more of the elongated stringers from at least one said section being configured to taper as the stringer approaches the interface.

17. The composite panel as recited in claim 16, wherein at least one of the first and second sections is formed from successive layers of a fiber-reinforced composite tape.

18. The composite panel as recited in claim 16, wherein the tapering comprises a reduction of thickness as the stringer approaches the interface between the first and second sections.

19. The composite panel as recited in claim 16, wherein the tapering comprises a reduction of the stiffness of the stringer as the stringer approaches the interface between the first and second sections.

20. The composite panel as recited in claim 19, wherein the stiffness is varied between about 16 MSI and about 2 MSI.

* * * * *